July 18, 1972 D. H. BROWN 3,677,905
COMBINED STEAM POWER PLANT AND WATER DISTILLATION SYSTEM
Filed May 6, 1970 3 Sheets-Sheet 1

Inventor:
Dale H. Brown,
by Paul G. Frank
His Attorney.

Inventor:
Dale H. Brown,
by Paul G. Frank
His Attorney.

United States Patent Office  3,677,905
Patented July 18, 1972

3,677,905
COMBINED STEAM POWER PLANT AND WATER DISTILLATION SYSTEM
Dale H. Brown, Scotia, N.Y., assignor to General Electric Company
Filed May 6, 1970, Ser. No. 35,208
Int. Cl. B01d 3/02
U.S. Cl. 202—172                  2 Claims

ABSTRACT OF THE DISCLOSURE

A combined steam power plant and water distillation system is disclosed wherein the distillation system is located between the first and last stages of the steam turbine used in the power plant. The distillation system does not fully cool the steam; rather, the steam is returned to the last turbine stage where it does work and produces power as it expands to the conventional turbine condenser pressure. In an alternate embodiment, the last stage of the turbine is a secondary fluid turbine. In this embodiment, the secondary fluid, which has a greater vapor density than steam at the relatively low temperature of the last stage, is vaporized by the last condensation stage of the distillation system.

This invention relates to combined steam power and water distillation systems. More particularly, the invention relates to a modification of these systems that will enable them to produce more power and at the same time reduce the cost of the distilled water produced.

In the prior art, combined steam turbine-distillation plants have been utilized for the production of fresh water as well as the production of electrical or mechanical power. In a typical installation, the last stage of a steam turbine and the condenser stage are removed and a distillation system is utilized in their place so that the steam is expanded in the steam turbine and discharged into the distillation system. However, in such systems, the equipment necessary for the final stages of distillation is relatively large and expensive, thereby raising the cost of the whole system as well as the cost of the water produced.

In view of the above, it is therefore an object of the present invention to reduce the size of the distillation equipment without reducing the efficiency of the distillation system.

A further object of the present invention is to increase the efficiency of steam power-distillation systems.

Another object of the present invention is to increase the power output of steam power-distillation systems without reducing fresh water production.

A further object of the present invention is to provide a steam power-distillation system wherein the relative amounts of power and fresh water produced may be variably controlled.

Another object of the present invention is to provide an improved efficiency steam power-distillation system utilizing a mid-stream distillation apparatus, i.e., distillation apparatus located between the first and last turbine stages.

A further object of the present invention is to provide an improved steam power-distillation system wherein at least the final turbine stage is driven by a secondary fluid.

The foregoing objects are achieved in the present invention wherein there is provided a steam power-distillation system in which the distillation apparatus is located between the first and last turbine stages. The distillation apparatus removed steam for distillation from the preceding turbine at the highest possible temperature. The steam remaining after the last stage of distillation is not condensed, as done previously, but rather is sent through a low pressure steam turbine where it is utilized to produce power.

In another embodiment, the condensation of the final stage steam to distillate is used to evaporate a secondary fluid, which has a greater vapor density than steam at a given temperature. This vaporized fluid is then used to drive a secondary fluid turbine whose output power is combined with that of the steam turbines.

The various features of the invention may best be understood by considering the following detailed description in conjunction with the attached drawings in which.

Figure 1:
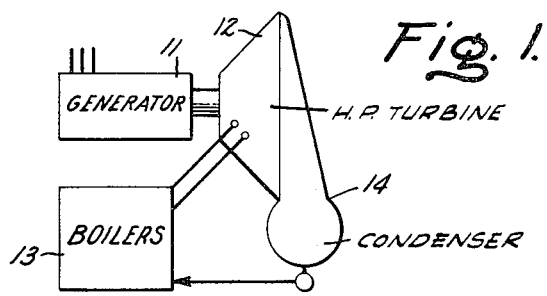
FIG. 1 illustrates a conventional steam turbine generating system as used in the prior art.

Referring to FIG. 1 there is shown in FIG. 1 a steam generating system of the prior art. In this system, steam from boilers 13 is passed through steam turbine 12 and allowed to expand thereby producing a mechanical power output which may be used to drive generator 11 which in turn generates electricity. The steam after passing through steam turbine 12 is condensed in condsenser 14 and returned to boilers 13 where it is reheated and passed through the system once again.

Figure 2:
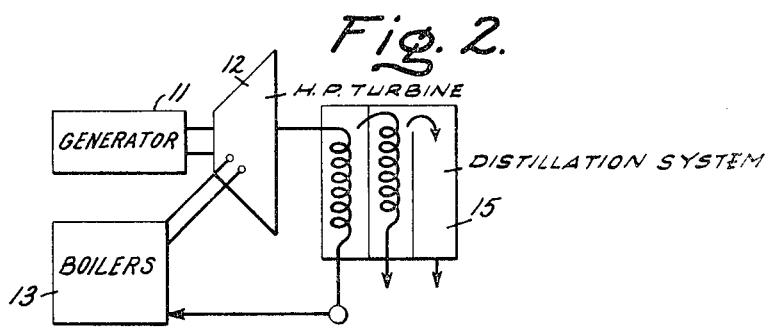
FIG. 2 illustrates a conventional combined steam turbine power plant and water distillation system.

FIG. 2 illustrates the conventional manner in which a distillation system is added to a steam turbine plant. In making this modification the condenser and last turbine stages are removed and distillation system 15 is substituted therefor. It can be seen that in this system a relatively large amount of power is lost to the distillation system which could be utilized in steam turbines.

Figure 3:
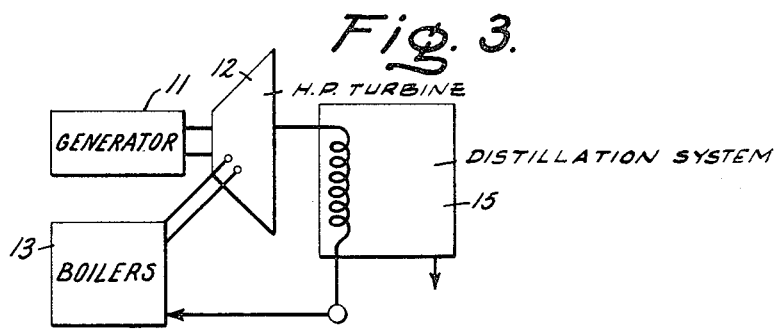
FIG. 3 illustrates a modified power plant and water distillation system.

In FIG. 3 there is illustrated a modification of the conventional manner in which a distillation system may be added. In this system, the steam is retained in the turbine to a lower pressure point depending upon the number of distillation stages. Thus, a greater proportion of the power available from the steam is utilized. At a given number of stages the system illustrated in FIG. 3 becomes the same as the system illustrated in FIG. 2, depending upon initial temperature and the temperature drop per stage of distillation.

Figure 4:
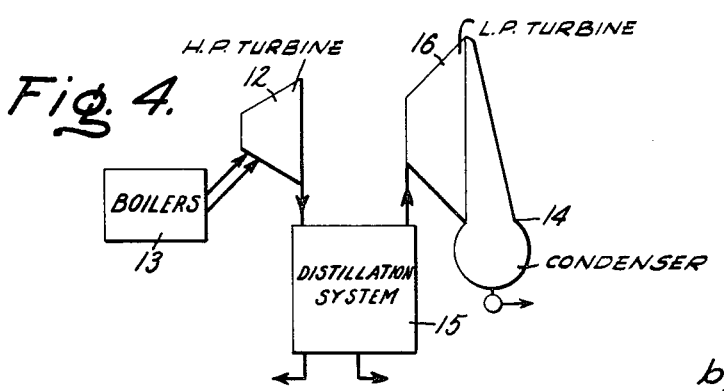
FIG. 4 illustrates a combined power plant and water distillation system arranged in accordance with the present invention.

In FIG. 4 there is shown one embodiment of the present invention wherein the distillation system is located between the first and last steam turbine stages. Specifically, in FIG. 4 steam from boilers 13 is delivered to first turbine stage 12 where a portion of the energy of the steam is converted into mechanical energy. The steam is then delivered to distillation system 15 at the highest practical temperature and pressure. The steam generated in the final stage of distillation is not condensed as in conventional practice. It is returned to a low pressure steam turbine to do work and produce power as it expands to the conventional turbine condenser pressure. Thus, the power producing capability of the distillate steam is utilized in a pressure system where the steam turbine is highly efficient and where the size of appropriate distillation equipment makes it economically unattractive to proceed with further distillation.

Figure 5:
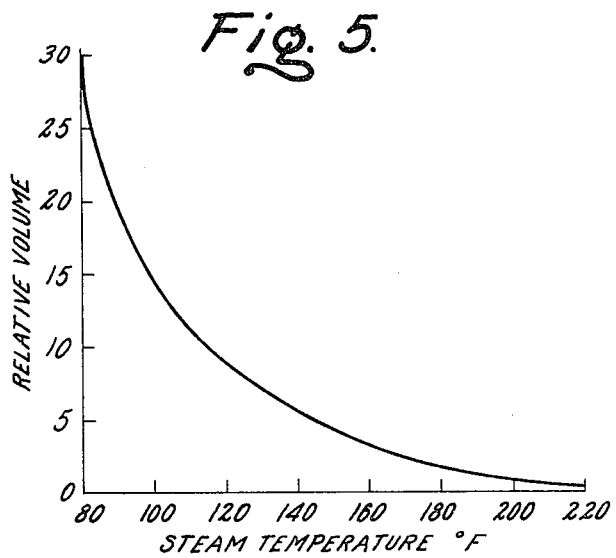
FIG. 5 illustrates the relationship between distillation stage size and stage temperature.

FIG. 5 shows a curve relating the relative size of the distillation stage to the temperature of the steam. It can be seen from FIG. 5 that low temperature stages become multiples of the size of the first stage of the distillation system. In FIG. 5 the volume at 220° F. is taken as the reference volume. At 120° F. the relative size of the distillation stage is ten times that of the stage operating at 220° F. Thus, it can be seen that from the present invention the size of the distillation plant can be made smaller than that presently available. Further, such a combined steam power-distillation plant will also produce more power by virtue of the fact that the steam is returned to a low pressure turbine for the production of additional power. The distillate steam is returned to a low pressure steam turbine and expanded to the turbine condenser pressure level, for example, corresponding to 90° F. The available energy of the distillate steam from the last distillation stage is not wasted in a high pressure condenser in the distillation plant. Instead it is utilized to produce power in the highly efficient expansion through a low pressure steam turbine. The steam output from the low pressure steam turbine is finally condensed at normal turbine condenser temperature.

The steam delivered from the turbine to the distillation stages may be superheated, saturated, or wet. In any case, it is condensed and returned to the boiler system as part of the first distillation stage. The distillate steam will typically be dry saturated steam. Thus, the low pressure steam turbine utilizes steam that is drier than the similar expansion in the last turbine stages of the power plant turbines of the prior art. Turbine stage efficiency improves about one percent for each one percent of the moisture reduction. Thus, the dryness of the distillate steam will improve turbine performance.

Figure 6:
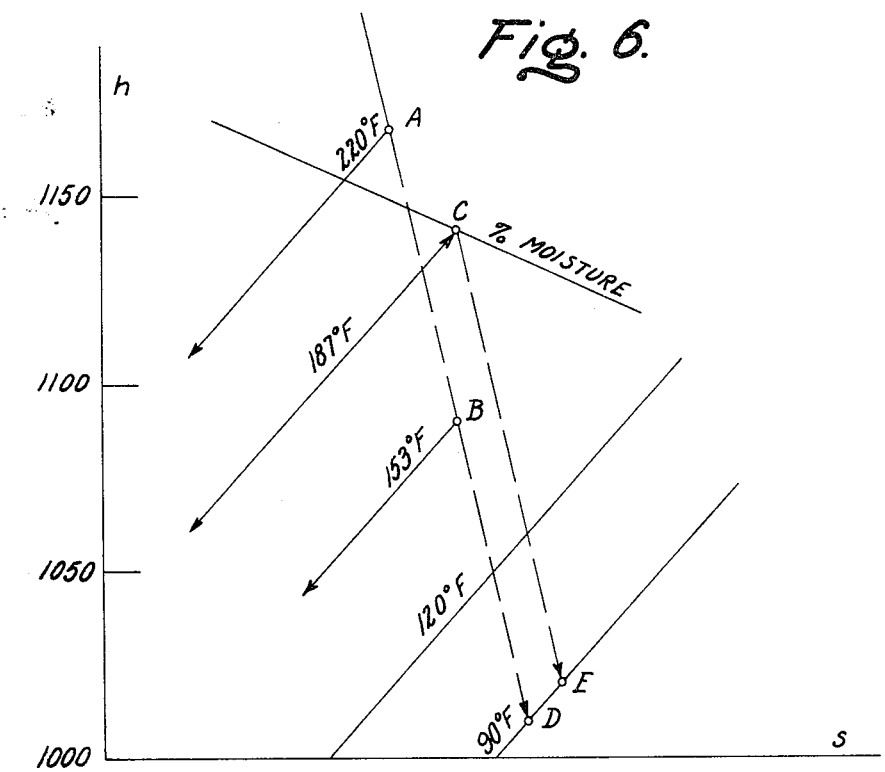
FIG. 6 is a section of a Mollier diagram useful in explaining the operation of the present invention.

A comparison of the present invention with the prior art may be clarified by reference to the section of a Mollier chart for steam as illustrated in FIG. 6. The vertical dimension is the enthalpy, $h$, which may be construed as the energy of the steam. The horizontal dimension is entropy, $s$. The steam in the turbine of the plant such as illustrated in FIG. 1 expands from point A downward to end point D at 8.8 percent moisture. The vertical distance A to D is the energy converted to work for each pound of steam at point A. The power plants as illustrated in FIGS. 2 and 4 remove all the steam at point A and utilize two stages of distillation. A power plant such as illustrated in FIG. 2 condenses the second stage of distillate steam at 187° F. The power plant of FIG. 4, however, does not condense the second stage distillate steam which is at condition C, dry and saturated. This steam is returned to a low pressure steam turbine and expanded to end point E. For each pound of steam removed at point A there are 0.82 pound of steam at point C. The vertical distance $C-E$ times 0.82 is the additional work produced in the power plant illustrated in FIG. 4 as compared to the power plant illustrated in FIG. 2. The power plant illustrated in FIG. 3 expands the steam at point A to the condition at point B for removal from the turbine. The two distillation stages of this power plant produce the same distillate output but condense the second stage steam at 120° F.

Thus, the combined power plant distillation system illustrated in FIG. 4 minimizes the necessary size of the distillation system by utilizing steam at the highest available temperature and pressure limited only by the practical considerations of scale formation. At the same time it largely preserves the beneficial expansion of steam to produce work in steam turbine components.

Figure 7:
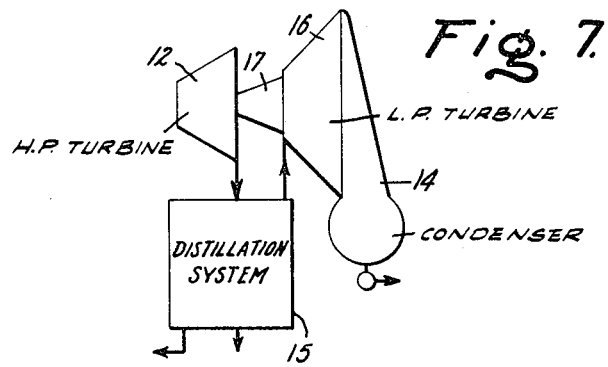
FIG. 7 illustrates an alternative embodiment of the present invention.

In FIG. 7 there is illustrated a modified form of the present invention that enables the use of a distillation system where the distillation steam requirement is only a modest fraction of the steam flow. Thus, there is provided between a first turbine stage 12 and final turbine stage 16 a pair of flow paths comprising a third steam turbine 17 and distillation system 15. In this manner the benefits of the drier steam for the final stages of the steam turbine are obtained as well as the benefits of a reduced size requirement for the distillation system.

Figure 8:
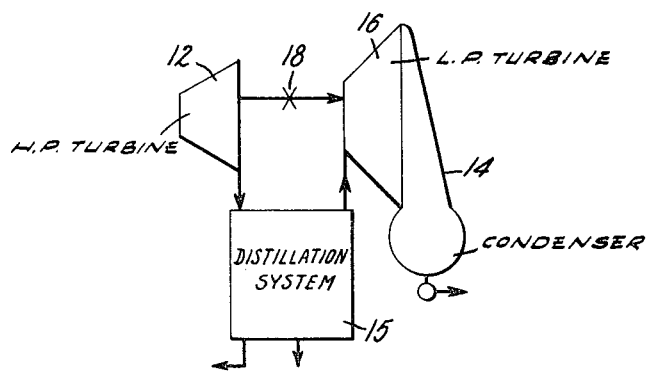
FIG. 8 illustrates another alternative of the embodiment of the present invention.

In FIG. 8 there is illustrated a combined power plant and distillation system in which the power production and distillate output may be variably controlled. In FIG. 8, high pressure turbine 12 and low pressure turbine 16 are connected by a pair of flow paths comprising distillation system 15 and a bypass valve 18. When bypass valve 18 is fully closed, the resultant system is the same as that illustrated in FIG. 4. When bypass valve 18 is fully open, the pressure differential across the distillation system is reduced and the temperature difference or heat transfer in a distillation system is reduced with a resultant reduction in distillate output and in the quantity of steam drawn from high pressure turbine 12. When bypass valve 18 is fully open, the distillation will be reduced to a very small rate. Thus, operation of the bypass varies the proportion of power production and gallons of distillate produced per unit time. When the bypass valve is fully open and the distillation system is flooded (or deprived of coolant) there will be no distillation and the entire capacity of steam turbines will be available for power production.

Figure 9:
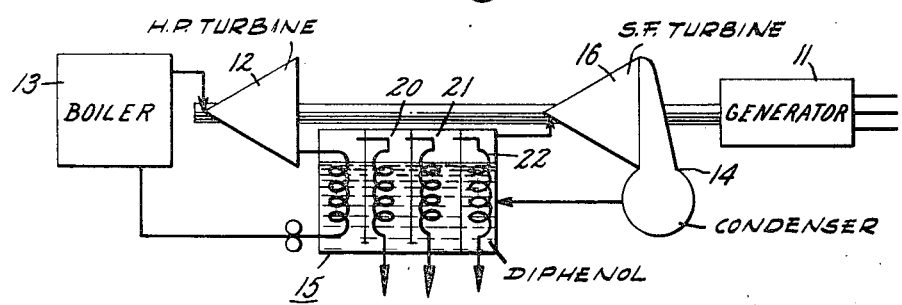
FIG. 9 illustrates a further alternate embodiment of the present invention.

In FIG. 9 there is illustrated an alternative embodiment of the present invention in which the heat from the last stages of the distillation system are utilized to vaporize a secondary fluid which is then used in the low pressure turbine. In this embodiment the steam from boiler 13 is passed through a high pressure and intermediate pressure turbines 12 to distillation system 20. Here the steam is passed through successive stages of distillation to where the last stage of distillation 21 transfers the heat required to make vapor of a fluid 22, such as diphenol. This secondary fluid must have a greater vapor density at a given temperature than steam at the same temperature. The secondary fluid vapor is introduced into a low temperature turbine stage 16 which will be smaller than the corresponding steam turbine stage due to the substitution of a more dense vapor. The expansion of a secondary vapor produces power that is added to the high pressure steam turbine power to produce mechanical output. A condenser receives the output vapor from the low pressure turbine and condenses the vapor for return to the distillation system. Feed-water heating and other practices common to steam turbine plant practice may be applied to the vapor to enhance the total plant performance.

This combination of steam turbine, distillation system and dense vapor turbine alleviates the extreme volumetric flow experienced by a large steam turbine. The low temperature turbine and its condenser will be greatly reduced in size due to the increase in density of the vapor selected for this application. This combination permits increased power and steam flow for large steam power plants.

Having thus described the present invention, it will be apparent to those skilled in the art that various modifications may be made without departing from the spirit and scope of the present invention.

What I claim as new and desired to secure by Letters Patent of the United States is:

1. A combined steam turbine-water distillation system comprising:

boiler means for supplying steam under pressure, first turbine means receiving said steam under pressure from said boiler for converting a portion of the energy of said steam into mechanical energy, distillation means receiving steam from said first turbine means for condensing a portion of said steam into water; said distillation means comprising a plurality of stages, one of which heats a secondary fluid to the vapor state at an elevated temperature, said secondary fluid having a vapor density at a given temperature and pressure that is greater than the vapor density of steam at said given temperature and pressure;

second turbine means receiving said secondary fluid from said distillation means for converting a portion of the energy of said fluid into mechanical energy, and means coupled to said second turbine means for condensing said fluid to a liquid state.

2. A combined steam turbine-water distillation system as set forth in claim 1 wherein said secondary fluid comprises diphenol.

References Cited

UNITED STATES PATENTS

| | | | |
|---|---|---|---|
| 3,489,652 | 1/1970 | Williamson | 203—11 |
| 3,412,558 | 11/1968 | Starmer | 60—67 |
| 3,016,712 | 1/1962 | Taylor | 60—67 |
| 3,451,220 | 6/1969 | Buscemi | 203—DIG 20 |
| 3,416,318 | 12/1968 | Chocquet | 203—DIG 20 |

NORMAN YUDKOFF, Primary Examiner

D. EDWARDS, Assistant Examiner

U.S. Cl. X.R.

202—174; 203—DIG 20, 11; 60—39.18 B